United States Patent
Swisher et al.

[11] Patent Number: 5,871,661
[45] Date of Patent: Feb. 16, 1999

[54] BAKING PAN ASSEMBLY FOR PREPARING DONUTS

[75] Inventors: Karen A. Swisher, Sierra Madre; Kirsten A. Pighin, Santa Rosa, both of Calif.

[73] Assignee: Huntington Food Products, Inc., Santo Rosa, Calif.

[21] Appl. No.: 715,030

[22] Filed: Sep. 17, 1996

[51] Int. Cl.$^6$ .................................................. A21B 5/00
[52] U.S. Cl. ..................... 249/120; 249/122; 249/DIG. 1
[58] Field of Search .............................. 249/120, DIG. 1, 249/122; 99/DIG. 15

[56] References Cited

U.S. PATENT DOCUMENTS

| | | | |
|---|---|---|---|
| 776,777 | 12/1904 | Dietz | 249/120 |
| 1,476,910 | 12/1923 | Naugle | 249/122 |
| 1,663,719 | 3/1928 | Morley | 426/549 |
| 1,900,290 | 3/1933 | Kudo | 249/57 |
| 2,097,356 | 10/1937 | Truesdale | 249/122 |
| 2,290,396 | 7/1942 | Webster | 425/812 |
| 2,678,143 | 5/1954 | Dillingham et al. | 249/126 |
| 3,478,998 | 11/1969 | Burford | 249/120 |
| 3,638,583 | 2/1972 | Goodier et al. | 249/122 |
| 3,727,875 | 4/1973 | Downing | 249/121 |
| 3,781,447 | 12/1973 | Durso | 426/513 |
| 3,831,507 | 8/1974 | Wheaton | 99/428 |
| 4,054,086 | 10/1977 | McNair | 99/374 |
| 4,175,483 | 11/1979 | Clark | 99/354 |
| 5,106,644 | 4/1992 | El-Nokaly | 426/603 |
| 5,133,984 | 7/1992 | Murphy et al. | 426/496 |
| 5,344,663 | 9/1994 | Jewell et al. | 426/549 |
| 5,403,610 | 4/1995 | Murphy et al. | 426/549 |

OTHER PUBLICATIONS

K–Blazer Fat Replacer, PN 73375, (No Date).
MicroGold MGP 9500 (No Date).
Instant Pure–Flo® F (1992).
Solka–Floc Nature's Remarkable Fiber Brochure, (No Date).

*Primary Examiner*—Robert Davis
*Attorney, Agent, or Firm*—Banner & Witcoff Ltd

[57] ABSTRACT

A baking pan assembly comprising a pan grid including a plurality of pan rows and pan columns that each contain at least one circular pan useful for baking doughnuts, and a low fat baking dough composition.

4 Claims, 2 Drawing Sheets

BAKING PAN ASSEMBLY FOR PREPARING DONUTS

BACKGROUND OF THE INVENTION (1) Field of the Invention

This invention is a dough useful for preparing low calorie doughnuts by baking. This invention is also a baking pan assembly including a plurality of circular pans that can be filled with the low calorie low fat dough and placed in an oven in order to prepare baked low calorie low fat doughnuts.

(2) Description of the Art

A number of prior art references disclose doughs, batters, and cooked products that are low in fat or fat free. For example, U.S. Pat. Nos. 5,403,610 and 5,133,984 disclose a process for preparing baked goods containing fibers and hydrocolloids. Specifically, the '610 patent describes doughs and batters that incorporate hydrated polysaccharide hydrocolloid and insoluble fiber in various ratios that are useful in fat free baked goods.

U.S. Pat. No. 5,344,633 discloses a bakery dough comprising a fat substitute. The fat substitute is a hydrocolloid fat substitute that is present in the dough composition in amounts sufficient to give a dough having a total fat content less than 15% based upon the weight of the flour used in the dough. The reduced fat dough is useful to formulate cookies and other bakery products.

This invention is also a baking pan for preparing baked doughnuts. Pans for baking doughnuts are disclosed in the prior art. One group of pans are designed like a waffle iron including a top and bottom clam-shell construction. Such pans are disclosed in U.S. Pat. Nos. 4,175,483 and 1,663,791.

Another clam-shell type baking pan is disclosed in U.S. Pat. No. 3,727,875 which describes a baking pan including a top and a bottom that unite to form an enclosed baking surface. When a baking dough is placed in the baking pan and the top and bottom are clamped together, the baked doughnut product conforms to the shape of both the top and the bottom pan portions.

U.S. Pat. No. 3,831,507 discloses a baking pan assembly for preparing a sandwich bun. The pan assembly includes three parts. The parts combine to produce a hollow sandwich bun that is essentially the negative of a doughnut shape.

U.S. Pat. No. 1,476,910 discloses a cake pan having a lid. The pan includes a flat surface including a plurality of cake pan depressions therein. The pans have a center flattened projection that abuts the center of the cake pan. The cake manufactured by the pan includes a partial bottom depression and a flat top.

U.S. Pat. Nos. 3,638,583, 2,097,356, and 1,900,290 disclose pans for manufacturing doughnuts. Each pan disclosed includes a flat plate with a plurality of depressions or wells for containing doughnut dough. Furthermore, each depression includes a center column that has a conical or dome shaped cap.

SUMMARY OF THE INVENTION

It is an object of this invention to provide a doughnut baking pan assembly that is useful in manufacturing a plurality of aesthetically pleasing baked doughnuts;

It is another object of this invention to provide a doughnut baking pan that is easy to handle and in which the baked product cools quickly;

It is still another object of this invention to provide a low fat baking dough that is useful for manufacturing tasty low fat baked doughnuts.

In one embodiment, this invention is a baking pan assembly useful for preparing a plurality of doughnuts. The baking pan assembly comprises a plurality of circular pans. Each circular pan includes an outwardly tapered outer wall, an inwardly tapered inner wall, a bottom uniting the outer wall with the inner wall, a center dome circumscribing the inner wall, and a rim circumscribing the top of the outer wall, wherein each circular pan has a diameter D1. The baking assembly also includes a pan support rack including a first end support, a second end support, and at least two lateral supports uniting the first end support and the second end support, wherein the first and second end supports are parallel to one another and wherein each lateral support is parallel to each other lateral support and wherein each lateral support is separated from its adjacent lateral support by a distance slightly less than D1. Finally, the rim of each circular pan rests on two adjacent parallel lateral supports.

In another embodiment, this invention is a low-fat baking batter useful for manufacturing baked products. The baking batter includes from about 62 to about 66 wt % dry ingredients and from about 34 to about 38 wt % wet ingredients. The dry ingredients include, on a weight basis, from about 42 to about 46 weight percent sugar, from about 34 to about 40 weight percent flour, from about 2.7 to about 3.2 weight percent baking powder, from about 5.0 to about 6.25 weight percent of a fat substitute, from about 0.7 to about 3.2 weight percent nonfat dry milk, from about 1.5 to about 1.8 weight percent powdered cellulose from about 1.5 to about 1.9 weight percent polydextrose, from about 0.7 to about 1.4 weight percent modified food starch from about 0.1 to about 0.5 weight percent baking soda, and from about 0.75 to about 0.9 weight percent of a stabilizer. The wet ingredients include, on a wet ingredient weight basis, from about 35 to about 45 weight percent egg whites, from about 55 to about 60 weight percent water, and from about 0.5 to about 5.0 weight percent natural or artificial flavors. The batter may optionally include flavorings, spices, essences, and oils.

DESCRIPTION OF THE DRAWINGS

There is shown in the drawings a presently preferred embodiment of a baking pan assembly of this invention wherein like numerals in the various Figures pertain to like elements and wherein.

DESCRIPTION OF THE CURRENT EMBODIMENT

The present invention is a baking assembly useful for preparing a plurality of doughnuts. The present invention is also a low fat baking dough that is used in conjunction with the baking pan assembly to manufacture low fat doughnuts.

Consumers of manufactured food products are becoming increasingly aware of the amount of fat that is in the foods they consume. As a result, consumers are demanding low fat, high quality manufactured food products. The baking pan assembly of this invention allows for the manufacture of doughnuts by baking instead of deep-fat frying thereby reducing the level of fat in the form of saturated and unsaturated frying oils in the final doughnut product. Likewise, the baking dough composition of this invention is comprised of low fat ingredients that allow the dough to be used to prepare a baked doughnut product having much less fat than conventional deep-fat fried doughnuts.

Figure 1:
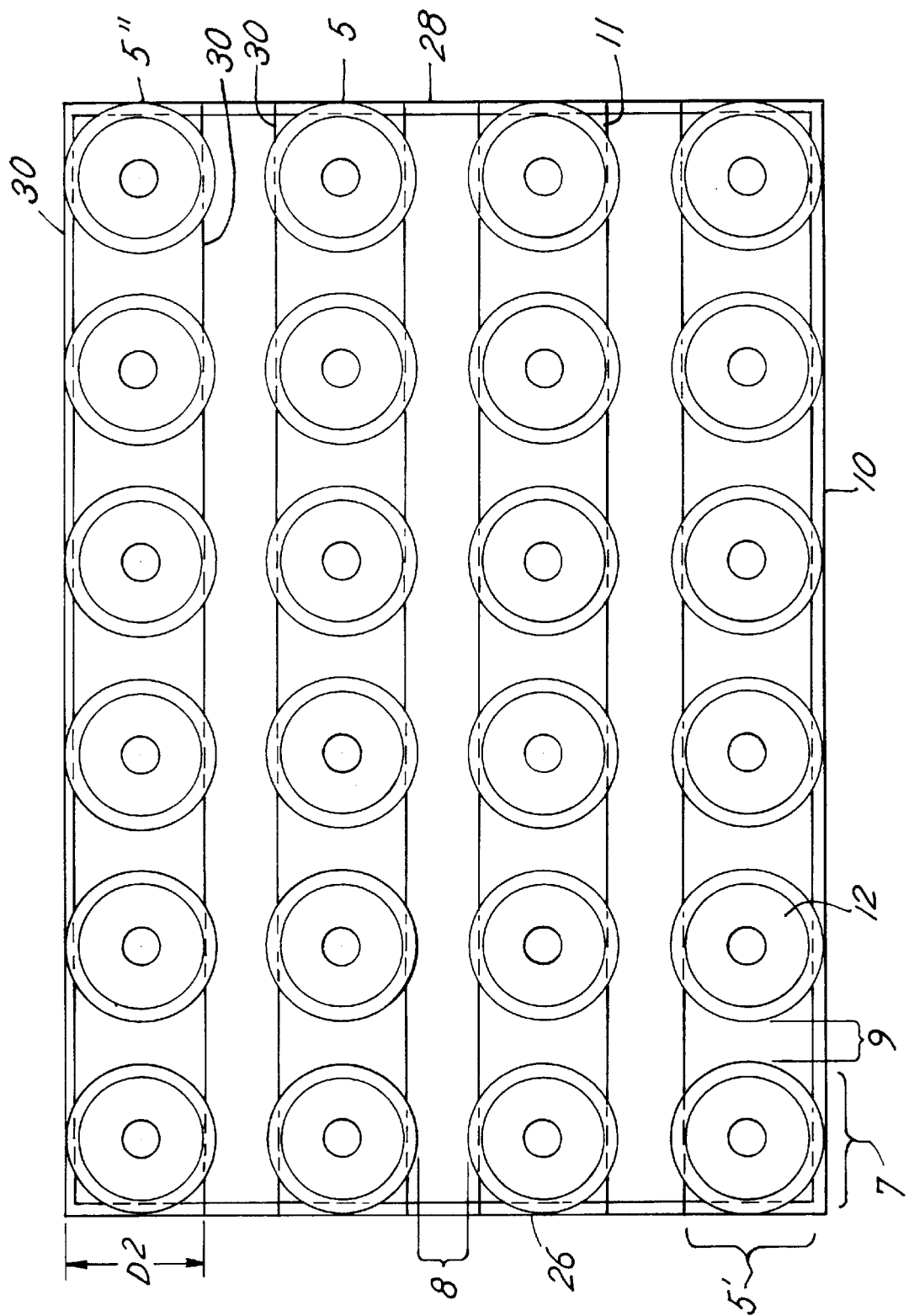
FIG. 1 is a top view of a preferred embodiment of a baking pan assembly of this invention.
Figure 2:
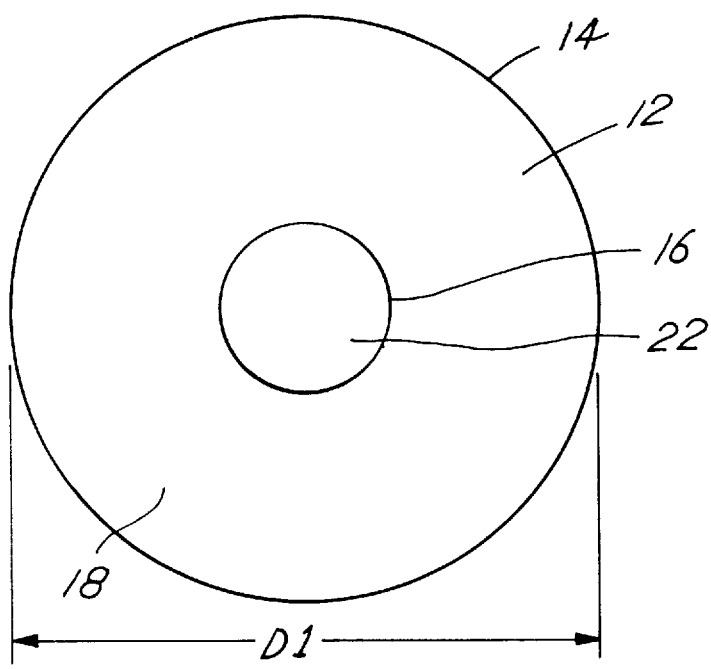
FIG. 2 is top view of a preferred embodiment of a circular pan useful in a baking pan assembly of this invention.
Figure 3:
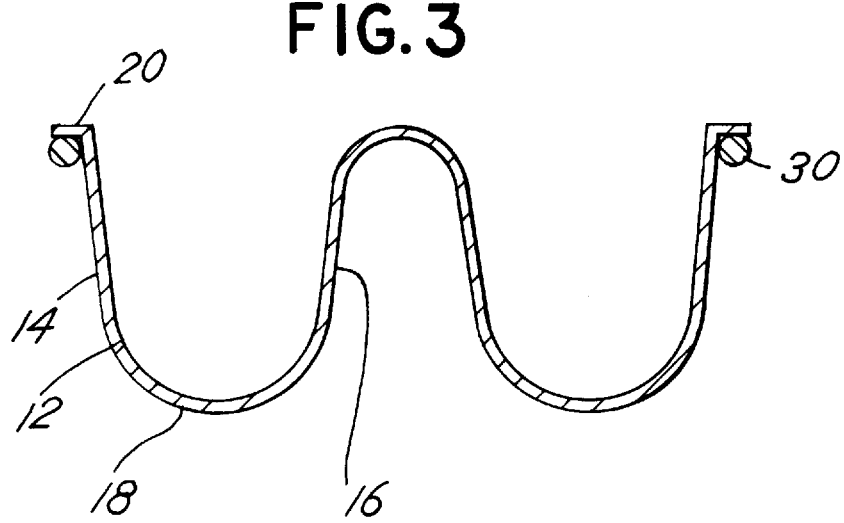
FIG. 3 is a side cutaway view of a preferred embodiment of a circular pan useful in a baking pan assembly of this invention.

FIGS. 1–3 depict a preferred embodiment of baking pan assembly 10 of this invention. Baking pan assembly 10 is comprised of a plurality of spaced circular pans 12. For ease and handling and in order to provide uniformity, circular pans 12 are preferably organized in a geometric pattern of rows 5 and columns 7 to give a baking pan assembly 10 with a square or rectangular pattern. In a preferred embodiment, baking pan assembly 10 comprises a plurality of rows 5 and columns 7 that define a pan support rack 11.

Pan support rack 11 is comprised of a first end support 26, a second end support 28 and by a plurality of lateral supports 30 which unite first end support 26 with second end support 28. First end support 26 and second end support 28 are preferably parallel. This means that the plurality of lateral supports 30 must also be parallel to one another, and perpendicular to first end support 26 and second end support 28 to give pan support rack 11 as shown in FIG. 1. First end support 26 and second end support 28 may be attached to lateral supports 30 by any means known in the art such as by welding, with screws, with an adhesive, or by any other means known for uniting metal pieces. Because baking pan assembly 10 will be exposed to high oven temperatures, the entire baking pan assembly including circular pans 12, first end support 26, second end support 28, and lateral supports 30 are manufactured out of a heat-resistant metal such as aluminum, steel, alloys thereof and any other metals or alloys that are used to manufacture baking pans.

A plurality of circular pans 12 are distributed throughout pan support rack 11 in a grid pattern to define pan rows 5 and pan columns 7. Each circular pan 12 is separated from an adjacent circular pan 12 by at least a first space 8 and a second space 9. First space 8 is defined as the distance between two circular pans 12 in a pan row 5 while second space 9 is defined as the distance between two circular pans 12 in a pan column 7. The distance defined in first space 8 and second space 9 may differ between circular pans 12 in the same pan row 5 or pan column 7. However, it is preferred that first space 8 is the same for all circular pans 12 defining baking pan assembly 10. Likewise, it is preferred that second space 9 is the same for all circular pans 12 defining baking pan assembly 10. However, it should be noted that first space 8 and second space 9 do not have to be equal distances.

Details of circular pan 12 are shown in FIGS. 2 and 3. Circular pan 12 is comprised of an outer wall 14, an inner wall 16, a bottom 18 which unites out of wall 14 with inner wall 16, a center dome 22 that covers the top of inner wall 16, and a rim 20 located around the periphery of top 19 of outer wall 14. It is preferred that bottom 18 of circular pan 12 is convex in order to impart a convex shape to the resulting baked doughnut product. Furthermore, it is preferred that outer wall 14 is outwardly tapered while inner wall 16 is inwardly tapered towards center dome 22.

Each circular pan 12 is secured in rack 11 so that the resulting baking pan assembly can be conveyed in and out of an oven as a unitary assembly. In a preferred embodiment, each circular pan 12 is placed on pan support rack 11 such that rim 20 rests on top of two lateral supports 30. In this preferred embodiment, the rim 20 of each circular pan 12 contacts the two lateral supports 30 at points in 180° opposition to one another. Circular pans 12 that are located in first row 5' or the last row 5" may also contact first end support 26 or second end support 28 at a point 90° around the circumference of rim 20 from the points where circular pan 12 contacts lateral supports 30.

In order for circular pans 12 to rest on pan support rack 11, the diameter, D1, of circular pan 12 must be slightly greater than the distance, D2, between lateral supports 30. When D1 is slightly greater than D2, the rim 20 of circular pans 12 can rest on lateral supports 30, thereby allowing pan support rack 11 to support a plurality of circular pans 12.

Circular pans 12 may be permanently or reversibly associated with pan support rack 11. For example, each circular pan 12 can be filled with dough and then placed into contact with lateral supports 30 of pan support rack 11. Pan support rack 11 can be placed in an oven and then removed when the baking is complete whereupon circular pans 12 can be disassociated from pan support rack 11. Alternatively, each circular pan 12 can be welded to pan support rack 11 at the point where each lateral support 30 contacts rim 20 of circular pan 12.

This invention is also a low fat baking dough. The low fat baking dough is useful for manufacturing a variety of baked products, but is most useful for manufacturing a baked low fat doughnut product. The low fat baking dough is manufactured from the combination of a mixture of dry ingredients and a mixture of wet ingredients. The dry ingredients include sugar, flour, baking powder, one or more fat substitutes, dry milk, powdered cellulose, polydextrose, modified starch, baking soda, and flavorings, spices, and oils.

Sugar is present in the dry ingredients in an amount ranging from about 42 to about 46 weight percent. Any kind or mixture of sugars may be used such as raw sugar, brown sugar, or white sugar, with white sugar being preferred.

Flour is present in the dry ingredients in an amount ranging from about 34.0 to about 40.0 weight percent. Any type of flour or mixtures of flours may be used such as bleached flour or whole wheat flour. Bleached flour, however, is preferred. Baking powder is present in the dry ingredients in an amount ranging from about 2.7 to about 3.0 weight percent.

The dry ingredients include from about 5.0 to about 6.25 weight percent of a fat substitute. Any dry fat substitute known in the art can be used in the low calorie baking dough composition of this invention. Examples of useful fat substitutes include denatured dairy whey protein, starches, sucrose polyestcis, gelling agents, polysaccharide-based hydrogels, hydrocolloides, and mixtures thereof alone or in combination with other dry baking dough ingredients. A dry fat substitute having the following composition is preferred.

| | |
|---|---|
| Whey | 20–50% |
| Propylene Glycol Mono and Diesters of Fats | 5–20% |
| Modified Food Starch | 5–20% |
| Oat Fiber | 5–20% |
| Mono and diglycerides | 5–20% |
| Polysorbate 60 | 5–20% |
| Sodium caseinate | <5% |
| Diacetyl tartaric acid esters of mono and diglycerides | <5% |
| Potassium phosphate | <5% |
| Silicon dioxide | <5% |
| Xanthan gum | <5% |

The preferred dry fat substitute is sold by Kraft Food Ingredients Technology Group, Memphis, Tenn. under the tradename K-BLAZER.

The dry ingredient also include from about 0.7 to about 3.2 weight percent dry non-fat milk powder, from about 0.1 to about 0.5 weight percent baking soda, and from about 0.5 to about 0.8 weight percent flavorings, spices, oils, combinations thereof, and any other ingredients that are known to those of skill in the art to enhance the flavor of baked products.

The dry ingredients further include from about 0.7 to 1.4 weight percent modified food starch. The modified (precooked) food starch increases the viscosity of the baking dough and it enhances the smooth texture of the resulting baking dough. The dry ingredients also include from about 1.5 to about 1.8 weight percent powdered cellulose. The powdered cellulose adds fiber to the baking dough and it also acts as a binding agent.

Useful ranges of the dry ingredients of each dry ingredient in the dry ingredient mixture are reproduced in Table I below.

TABLE I

| DRY INGREDIENTS | INGREDIENT WEIGHT RANGE WT % |
|---|---|
| Granulated Sugar | 42.0–46.0 |
| All Purpose Flour | 34.0–40.0 |
| Fat Substitute | 5.0–6.25 |
| Baking Powder | 2.7–3.2 |
| Nonfat Dry Milk | 0.7–3.2 |
| Powdered Cellulose | 1.5–1.9 |
| Polydextrose | 1.5–1.9 |
| Modified Starch | 1.5–1.9 |
| Flavorings/Spices/Oils | 0.5–0.8 |
| Baking Soda | 0.1–0.5 |

The dry ingredient mixture may include any other optional ingredients that are known to those of skill in the baking arts. Optional ingredients may include, for example, flavorings, dry flavorings, cocoa powder, buttermilk solids, spices, essences, oils, and any other ingredients known to one of skill in the art as being useful in a baking dough or baked product without adding fat to the final product.

The dough may optionally include from about 0.75 to about 0.90 weight percent (on a wet ingredient basis) of a stabilizer. The stabilizer allows baked products to retain their appearance and texture when heated or reheated in a microwave oven when frozen and thawed, and to prevent moisture migration between the two systems of the doughnut, i.e., between the cake and the icing. Useful stabilizers will include ingredients such as gums, dry whey, lecithin, food starch, shortening, whole egg solids, monoglycerides, and non-fat dry milk. A preferred stabilizer is manufactured by MicroGold of Oklahoma City, Okla. and sold under the trade name MicroGold MGP 9500.

The baking dough of this invention includes a mixture of wet ingredients. The wet ingredients include, but are not limited to, egg whites, water and natural and artificial flavors. A preferred flavoring is natural or imitation vanilla flavoring. These primary wet ingredients are found in the wet ingredient mixture in the weight percent range as set forth in Table II below.

TABLE II

| WET INGREDIENTS | USEFUL INGREDIENT WEIGHT RANGE WT % |
|---|---|
| Egg Whites | 33–44% |
| Water | 49–64% |
| Flavors | 0.5–6% |
| TOTAL | 100% |

Other optional wet ingredients that are known to those skilled in the baking arts may be incorporated into the wet ingredient portion of the low fat baking mix of this invention. Examples of optional wet ingredients include flavorings, essences, oils, juice, or buttermilk.

There is a preferred procedure for combining the wet ingredients and the dry ingredients to form the low fat baking dough of this invention. It is preferred that the dry ingredients be combined in a mixer and mixed prior to the addition of the wet ingredients. The wet ingredients should be gradually added to the dry ingredients as an admixture. Once all of the wet ingredients are combined with all the dry ingredients, the dough is mixed for from about 1 to about 2 minutes in a mixer. The sides of the mixing bowl are then scraped down and the batter is mixed for additional 1 to 2 minutes to aireate the batter. It is preferred that the weight ratio of wet ingredients to dry ingredients useful in the baking dough of this invention range from about 34–38 wt % wet ingredients to about 62–66 wt % dry ingredients.

Once the low fat baking dough of this invention has been prepared, a measured amount of dough is placed in each circular pan 12 associated with baling pan assembly 10. In order to facilitate the removal of the baked doughnut product from circular pans 12, it is preferred that each circular pan 12 is sprayed with a small amount of a release material, such as vegetable oil, prior to the addition of the low fat baking dough to circular pan 12.

Baking pan assembly 10, comprising a plurality of circular pans 12, are each loaded with a measured amount of low fat baking dough. The loaded baling pan assembly is then placed in an oven at from about 350° F. to about 425° F. for the period of time ranging from about 7 to about 12 minutes. Once baking is complete, the baking pan assembly is removed from the oven and the baked low fat doughnuts are removed from each circular pan 12 to give baked doughnuts. After removing the doughnuts from the baking pans, the baked doughnuts may be glazed, powdered, topped or filled. The resulting low fat baked doughnuts will each have a fat content of about 2.0 to about 4.0 wt. %. On a calorie basis, this means that the low fat baked doughnut will have from about 20 to about 40 calories in the doughnut from fat or from about 8 to about 12% of the calories in the doughnut from fat.

EXAMPLE 1

Low fat baked doughnuts were prepared as follows. First, a mixture of dry ingredients in the amounts set forth in Table III were combined in a blender.

TABLE III

| FORMULATION: Step I INGREDIENTS | PERCENT RANGE | ACTUAL |
|---|---|---|
| Granulated Sugar | 42.0–46.0 | 43.90 |
| All Purpose Flour | 34.0–40.0 | 35.95 |
| Fat Substitute | 5.0–6.25 | 5.50 |
| Baking Powder | 2.7–3.2 | 2.99 |

TABLE III-continued

| FORMULATION: Step I INGREDIENTS | PERCENT RANGE | ACTUAL |
|---|---|---|
| Nonfat Dry Milk | 0.7–3.2 | 2.99 |
| Powdered Cellulose | 1.5–1.9 | 1.61 |
| Polydextrose | 1.5–1.9 | 1.61 |
| Modified Starch | 1.5–1.9 | 1.61 |
| Flavorings/Oils/Spices | 0.5–0.8 | 0.50 |
| Baking Soda | 0.1–0.5 | .34 |
| TOTAL | | 100.00 |

The dry ingredients were combined in a dry blending mixer—according to the recipe set forth in Table III above. Next, a stabilizer (MicroGold NGP9500) consisting of 0.8 weight percent of the total ingredient weight was added to the dry ingredients after which the wet ingredients listed in Table IV, below, were then combined with the mixed dry ingredients.

TABLE IV

| FORMULATION: Step II INGREDIENTS | PERCENT |
|---|---|
| Dry Ingredients | 64.5 |
| Egg Whites | 14.0 |
| Water | 20.5 |
| Stabilizer | 0.8 |
| Natural Vanilla Flavor | 0.2 |
| TOTAL | 100.0% |

The combined ingredients were mixed on low speed for one minute. The bowl is scraped down, and then blending is resumed at medium speed for an additional two minutes.

The wet ingredients were combined with the dry ingredients on a 35–65% weight basis to give a baking dough. 55 grams of the baking dough was placed in each release spray treated circular pan. The baking pan assembly was placed in a 425° F. oven for about 7 to about 12 minutes or until the doughnuts were golden brown. The average baked weight of each doughnut was about 47–50 grams. The fat content of each glazed doughnut ranged from about 1.5 to about 2.5 grams from fat.

The description above has been offered for illustrative purposes only, and it is not intended to limit the scope of the invention of this application which is defined in the following claims.

What we claim is:

1. A baking pan assembly for receiving a plurality of measured, preselected amounts of a low fat doughnut baking dough and for baking each of said preselected amounts into a plurality of aesthetically pleasing baked doughnuts, said baking pan assembly comprising:

a support rack having first and second spaced end supports;

first and second spaced lateral pan supports uniting said first and second end supports for forming said support rack;

a plurality of individual baking pans being mounted in spaced relationship to each other on and between said end supports and being fixedly secured to and supported on each of said spaced lateral supports, said baking pans defining a row of baking pans and an open air space being defined between each of said spaced baking pans;

each of said pans having a substantially circular upper rim attached at opposite positions to said pan supports and defining an open top for each said pan for passage of said dough into and removal of said baked doughnut from each said pan having a downwardly and inwardly tapered fully closed outer wall, having a downwardly and outwardly tapered fully closed inner wall with an upper portion, said inner wall being spaced substantially concentrically inwardly from said outer wall, and having a fully closed downwardly convex shaped bottom wall for interconnecting said outer wall and said inner wall; and a baking chamber defined by said outer wall, said inner wall, and said bottom wall, said outer wall, said inner wall, and said bottom wall being unitarily formed, each said baking chamber being sized and shaped for receiving said preselected amount of said doughnut baking dough and each of said baking chamber also being sized and shaped to produce one of said aesthetically pleasing baked doughnuts.

2. The baking pan assembly of claim 1, including at least third and fourth spaced lateral supports, said third and fourth spaced lateral supports being spaced from said first and second spaced lateral supports in spaced relationship thereto, and a plurality of said individual baking pans being mounted in spaced relationship to each other on and between said end supports and being fixably secured to each of said spaced lateral supports, said baking pans on said third and fourth spaced lateral supports defining an additional row of baking pans and air spaces being defined between the row of baking pan being mounted on said first and second spaced lateral supports.

3. The baking pan assembly of claim 1 wherein a closed upper dome is unitarily formed at said upper position.

4. The baking pan assembly of claim 1 wherein each said pan is circular and has a preselected diameter and wherein said first and second lateral supports are separated from each other by a distance slightly less than said preselected diameter.

* * * * *